US012633238B2

(12) United States Patent
Liang

(10) Patent No.: US 12,633,238 B2
(45) Date of Patent: May 19, 2026

(54) ADVERTISING APPARATUS

(71) Applicant: LINKSIGN TECHNOLOGY LIMITED, New York, NY (US)

(72) Inventor: Lihong Liang, Shenzhen (CN)

(73) Assignee: LINKSIGN TECHNOLOGY LIMITED, New York, NY (US)

( * ) Notice: Subject to any disclaimer, the term of this patent is extended or adjusted under 35 U.S.C. 154(b) by 0 days.

(21) Appl. No.: 19/286,921

(22) Filed: Jul. 31, 2025

(65) Prior Publication Data

US 2026/0045183 A1     Feb. 12, 2026

(30) Foreign Application Priority Data

Aug. 10, 2024    (CN) .......................... 202421930391.2

(51) Int. Cl.
| | |
|---|---|
| *G09F 27/00* | (2006.01) |
| *G02F 1/1333* | (2006.01) |
| *G02F 1/1335* | (2006.01) |
| *G02F 1/13357* | (2006.01) |
| *G06F 3/147* | (2006.01) |
| *G09F 9/35* | (2006.01) |

(52) U.S. Cl.
CPC ........ G09F 27/00 (2013.01); G02F 1/133308 (2013.01); G02F 1/133504 (2013.01); G02F 1/1336 (2013.01); G06F 3/147 (2013.01); G09F 9/35 (2013.01)

(58) Field of Classification Search
CPC ............. G09F 27/00; G09F 9/35; G06F 3/147
See application file for complete search history.

(56) References Cited

U.S. PATENT DOCUMENTS

| | | | | |
|---|---|---|---|---|
| 4,934,079 | A * | 6/1990 | Hoshi ..................... | G09F 27/00 |
| | | | | 446/175 |
| 5,663,746 | A * | 9/1997 | Pellenberg .......... | G09F 15/0081 |
| | | | | 434/105 |
| 12,100,320 | B1 * | 9/2024 | Krantz ...................... | G09F 9/30 |
| 2003/0146974 | A1 * | 8/2003 | Murphy .................. | G09F 27/00 |
| | | | | 348/E7.086 |
| 2010/0142149 | A1 * | 6/2010 | Nakamichi ............... | G09F 9/35 |
| | | | | 361/701 |
| 2010/0296234 | A1 * | 11/2010 | Crick, Jr. ................ | G09F 27/00 |
| | | | | 361/679.21 |

(Continued)

*Primary Examiner* — Gary C Hoge
(74) *Attorney, Agent, or Firm* — HOWARD M COHN and Associates, LLC

(57) ABSTRACT

An advertising apparatus compatible with multiple playback modes is provided, including a main body. The main body includes a display screen, a multi-function control module, a video box mounting component, a power supply board, a control box, and tempered glass. The tempered glass covers the display screen and an end face of the control box. The display screen is electrically connected to the multi-function control module and the power supply board. The video box mounting component is configured to connect and mount a video box. The multi-function control module is integrated with a video and data signal input/output module. The video and data signal input/output module includes video and data signal input ports. The power supply board includes a power supply interface. The multi-function control module is configured to output system signals thereof to the display screen through the video and data signal input/output module for display.

16 Claims, 10 Drawing Sheets

(56) References Cited

U.S. PATENT DOCUMENTS

| | | | |
|---|---|---|---|
| 2014/0185205 A1* | 7/2014 | Tippmann .......... | G06Q 30/0641 |
| | | | 361/679.01 |
| 2015/0138118 A1* | 5/2015 | Liu ......................... | G09F 27/00 |
| | | | 345/173 |
| 2018/0336596 A1* | 11/2018 | Wang ...................... | H04L 12/12 |
| 2019/0026062 A1* | 1/2019 | Seo ....................... | G06F 3/1446 |
| 2019/0289756 A1* | 9/2019 | Lee ....................... | G09F 15/005 |
| 2019/0347060 A1* | 11/2019 | Vanti .................... | B62B 3/1412 |
| 2021/0173604 A1* | 6/2021 | Park ........................ | G09F 27/00 |
| 2021/0293377 A1* | 9/2021 | Chow ..................... | A47G 1/02 |
| 2021/0313927 A1* | 10/2021 | Dunn ...................... | H02S 30/10 |
| 2022/0058689 A1* | 2/2022 | Kim ....................... | G06Q 50/10 |
| 2023/0164964 A1* | 5/2023 | Dunn ................ | H05K 7/20981 |
| | | | 361/688 |
| 2023/0335071 A1* | 10/2023 | Kim ......................... | G09F 9/35 |
| 2024/0096246 A1* | 3/2024 | Dunn ..................... | G09F 13/02 |
| 2025/0199751 A1* | 6/2025 | Afshar ................... | G06F 3/044 |

* cited by examiner

8

713

711

9

7

710

310

3

5

510

ADVERTISING APPARATUS

TECHNICAL FIELD

The present disclosure relates to the field of advertising apparatuses, and in particular to an advertising apparatus compatible with multiple playback modes.

BACKGROUND

An advertising apparatus serves as a medium for merchants to display promotional information. The merchants may use the advertising apparatus to present text, images, audio, and video content for playback, thereby achieving promotional objectives.

However, conventional advertising apparatuses are poor in compatibility, as they are limited to operating solely through built-in operating interface systems. Such rigidity poses significant limitations. For example, if users are dissatisfied with built-in motherboard configuration or operating system of a given advertising apparatus during subsequent use, the users are unable to conveniently adjust or switch the advertising machine to a desired media input source due to a fixed main control system configured at the time of manufacture.

SUMMARY

The present disclosure mainly aims at above problems, and provides an advertising apparatus compatible with multiple playback modes to solve technical problems in the background art.

In order to achieve above aims, the present disclosure provides a first embodiment of the advertising apparatus compatible with multiple playback modes, including a main body. The main body includes a display screen, a multi-function control module, a video box mounting component, a power supply board, a control box, and tempered glass. The tempered glass covers the display screen and an end face of the control box. The display screen is electrically connected to the multi-function control module and the power supply board. The video box mounting component is configured to connect and mount a video box. The multi-function control module is integrated with a video and data signal input/output module. The video and data signal input/output module includes video and data signal input ports. The power supply board includes a power supply interface. The multi-function control module is configured to output system signals thereof to the display screen through the video and data signal input/output module for display. The video and data signal input/output module is configured to output input video signal sources and data signal sources to the display screen for display.

Furthermore, the video and data signal input/output module further includes at least one video and data signal output port. Each of the video and data signal input ports is selected from High-Definition Multimedia Interface (HDMI), Video Graphics Array (VGA), DisplayPort (DP), Digital Visual Interface (DVI), Universal Serial Bus (USB) Type-C, composite video interface, Secure Digital (SD) card slot, and USB Type-A. The at least one video and data signal output port is selected from Embedded DisplayPort (eDP), Low-Voltage Differential Signaling (LVDS), and V-by-One®.

Furthermore, the video and data signal input/output module includes at least one first memory port. The multi-function control module is configured to read multimedia files stored in a memory connected to the at least one first memory port and display the multimedia files on the display screen or copy the multimedia files to a built-in memory of the multi-function control module.

Furthermore, the video and data signal input/output module includes at least one of a subscriber identity module (SIM) card slot and a first Ethernet port. The multi-function control module is configured to display streaming media data on the display screen, and the streaming media data is received either through a SIM card inserted into the SIM card slot or via the first Ethernet port.

Furthermore, the advertising apparatus further includes the video box mounting component, the video box mounting component is configured to connect to and mount the video box, and the video box is selected from a digital television box, a television set-top box, a network media player box, a personal computer, a tablet computer, a mobile phone, a Digital Versatile Disc (DVD) player, and a Video Compact Disc (VCD) player.

Furthermore, the video box mounting component is disposed in the control box, the video box mounting component is a bracket structure having at least one open end. The video box mounting component includes a connecting portion, the connecting portion is configured to be connected to the main body.

Furthermore, the display screen is vertically connected to the control box. The multi-function control module, the power supply board, and the video box mounting component are all disposed in the control box.

Furthermore, the advertising apparatus further includes an extension adapter board, the extension adapter board is disposed on the main body. The extension adapter board includes a second Ethernet port, at least one second memory port, a second power supply port, a second antenna, and a master switch. The second Ethernet port, the at least one second memory port, the second power supply port, the second antenna, and the master switch are exposed on an outer side of the main body. An output terminal of the second Ethernet port, an output terminal of the at least one second memory port, an output terminal of the second power supply port, and an output terminal of the second antenna are disposed on one end of an inner cavity of the main body. The output terminal of the second Ethernet port, the output terminal of the at least one second memory port, the output terminal of the second power supply port, and the output terminal of the second antenna are respectively electrically connected to an input terminal of the first Ethernet port, an input terminal of the at least one first memory port, an input terminal of a first power supply port, and an input terminal of a first antenna through corresponding cables. The master switch is electrically connected to the multi-function control module.

Furthermore, the advertising apparatus further includes two protective covers. A box cover is lockable and is rotatably connected to the control box. The two protective covers respectively enclose the multi-function control module and the video and data signal input/output module. Each of the two protective covers includes at least one opening at one side thereof for at least one cable to pass through.

Furthermore, the advertising apparatus further includes at least one speaker and a power supply socket. The power supply socket is disposed in the control box. The at least one speaker is electrically connected to the multi-function control module. The power supply socket is electrically connected to the second power supply port of the extension adapter board.

The present disclosure further provides a second embodiment of the advertising apparatus compatible with multiple playback modes, including the main body. The main body include the display screen and the tempered glass. The display screen includes liquid crystal glass, a brightness enhancement film, a diffusion film, a light guide plate, a reflective film, a pressing strip, a logic board bracket, and a logic board. The liquid crystal glass, the brightness enhancement film, the diffusion film, the light guide plate, the reflective film, the pressing strip, the logic board bracket, and the logic board are sequentially disposed from a front side of the main body to a rear side of the main body. The display screen further includes a light strip. The main body includes an aluminum profile middle frame and a rear cover plate. The tempered glass and the rear cover plate are respectively disposed at a front side of the aluminum profile middle frame and a rear side of the aluminum profile middle frame, the tempered glass and the rear cover plate are connected to the aluminum profile middle frame to enclose the display screen. The light strip is disposed on an inner side of the aluminum profile middle frame and adjacent to at least one side of the light guide plate.

Furthermore, the display screen further includes a heat dissipation plate for the light strip, and the heat dissipation plate is disposed behind the reflective film and the light strip.

Furthermore, light emitted by the light strip passes through the light guide plate and is reflected forward by the reflective film behind the light guide plate, and reflected light then sequentially passes through the diffusion film, the brightness enhancement film, the liquid crystal glass, and the tempered glass.

The present disclosure further provides a third embodiment of the advertising apparatus compatible with multiple playback modes, including the main body. The main body includes the display screen, the multi-function control module, the video box mounting component, the power supply board, and the control box. The video box mounting component is disposed in the control box, the video box mounting component is the bracket structure having the at least one open end. The video box mounting component includes the connecting portion, the connecting portion is configured to be connected to the main body. The display screen is vertically connected to the control box. The multi-function control module, the power supply board, and the video box mounting component are all disposed in the control box.

Furthermore, the advertising apparatus further includes a power supply socket. The power supply socket is disposed in the control box, and a socket orientation of the power supply socket is non-parallel to a thickness direction of the control box.

Furthermore, the advertising apparatus further includes an extension adapter board, the extension adapter board is disposed on the main body. The extension adapter board includes the second Ethernet port, the at least one second memory port, the second antenna, and the master switch. The second Ethernet port, the at least one second memory port, the second antenna, and the master switch are exposed on an outer side of the main body. The output terminal of the second Ethernet port and the output terminal of the at least one second memory port are disposed on the one end of the inner cavity of the main body. The output terminal of the second Ethernet port and the output terminal of the at least one second memory port are respectively electrically connected to the input terminal of the first Ethernet port and the input terminal of the at least one first memory port through corresponding cables. The master switch is electrically connected to the power supply board.

Compared to the prior art, the present disclosure provides the advertising apparatus compatible with the multiple playback modes. When functionality of the multi-function control module fails to meet user requirements, a user is capable of connecting the video box to the video and data signal input ports of the video and data signal input/output module, the video box is a user-owned device, and the video box is stably connected to the main body through the video box mounting component. Through an operating interface system of the multi-function control module or automatic recognition, the advertising apparatus switches a corresponding display video signal source to the video box, at this time, the video box serves as a video signal input terminal of the display screen.

Figure 1:
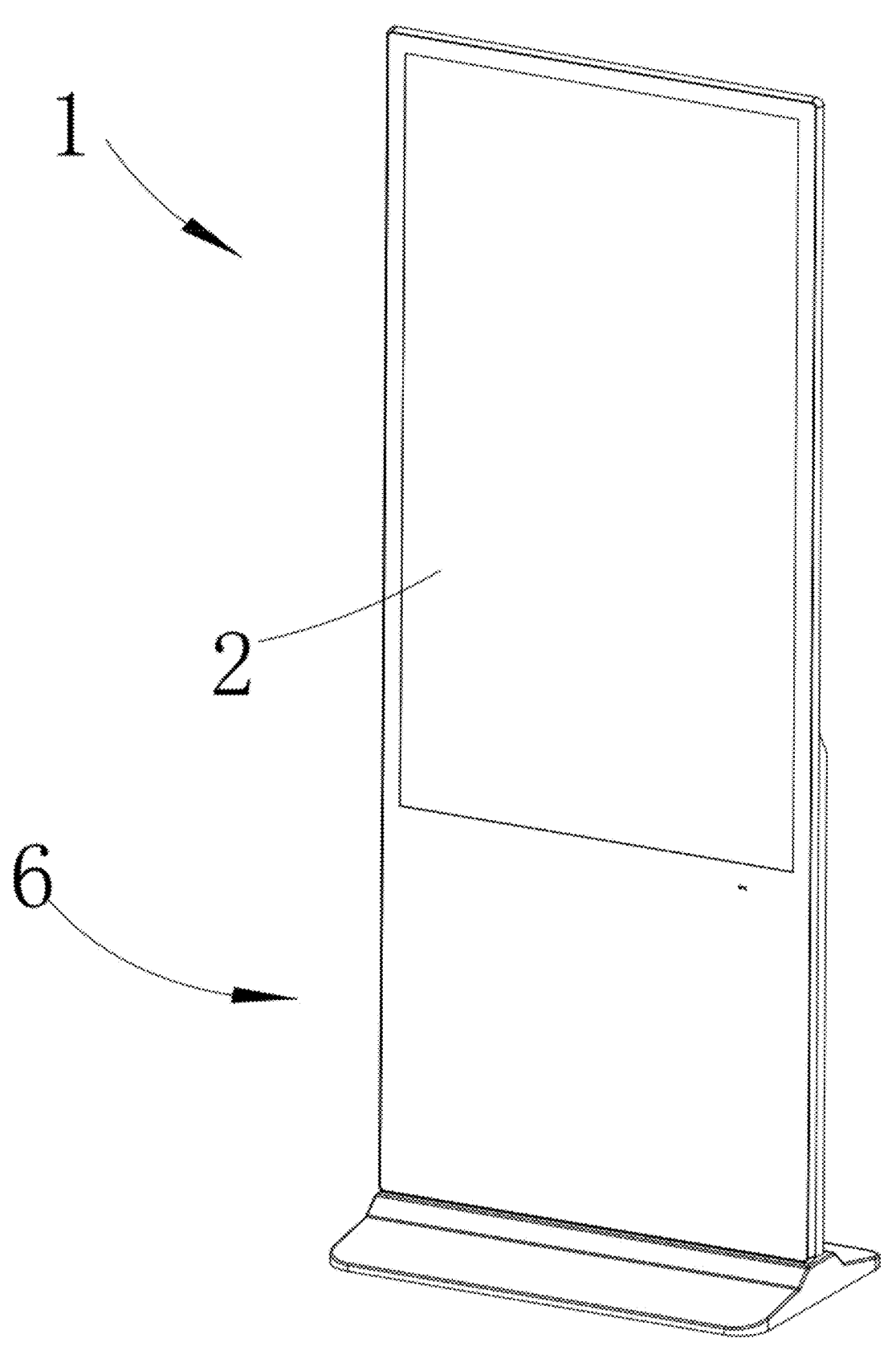
FIG. 1 is a structural schematic diagram of an advertising apparatus compatible with multiple playback modes according to the present disclosure.

Reference numerals in the drawings: 1. main body; 110. aluminum profile middle frame; 120. rear cover plate; 2. display screen; 210. liquid crystal glass; 220. brightness enhancement film; 230. diffusion film; 240. light guide plate; 250. reflective film; 260. pressing strip; 270. logic board bracket; 280. logic board; 290. light strip; 20100. heat dissipation plate; 3. multi-function control module; 310. video and data signal input/output module; 311. first memory port; 312. subscriber identity module (SIM) card slot; 313. first Ethernet port; 314. video and data signal input port; 315. video and data signal output port; 316. first power supply port; 4. power supply board; 5. video box mounting component; 510. connecting portion; 6. control box; 610. box cover; 620. locking component; 630. inserting bracket; 640. tempered glass; 650. bottom mounting plate; 660. rear box cover; 661. handle; 670. mounting bracket; 7. extension adapter board; 710. second power supply port; 711. second memory port; 713. second Ethernet port; 8. antenna; 9. master switch; 10. speaker; 11. power supply socket; 12. protective cover; 13. bottom base; 1301. inserting hole; 14. remote control head; 15. remote control head bracket; 16, caster wheel.

DETAILED DESCRIPTION OF EMBODIMENTS

Technical solutions in embodiments of the present disclosure are clearly and completely described below with reference to accompanying drawings in the embodiments of the present disclosure, and obviously, the described embodiments are only a part but not all of the embodiments of the present disclosure. All other embodiments obtained by those who skilled in the art based on the embodiments of the present disclosure without creative efforts shall fall within a protection scope of the present disclosure. It should be understood that the drawings are only provided with reference and description, and are not intended to limit the present disclosure. Connection relationship shown in the accompanying drawings is merely for ease of clear description, and does not limit a connection manner.

It should be noted that when one component is considered to be "connected to" another component, it may be directly connected to another component, or a centering component may exist at the same time. Unless otherwise defined, all technical and scientific terms used herein have the same meaning as commonly understood by those who skilled in the art. It should also be noted that, unless expressly specified and limited otherwise, terms "mounted", "connected with", and "connected to" should be understood in a broad sense, for example, may be a fixed connection, a detachable connection, or an integral connection; and may be a mechanical connection or an electrical connection, and may be a communication inside two components. For those who skilled in the art, specific meanings of the above terms in the present disclosure may be understood according to specific situations. Terms used in the specification of the present disclosure are merely for a purpose of describing specific embodiments, and are not intended to limit the present disclosure.

It should also be noted that, in the description of the present disclosure, orientation or position relationship indicated by terms "center", "upper", "lower", "left", "right", "vertical", "horizontal", "inner", "outer", etc. are based on orientation or position relationships shown in the accompanying drawings, rather than indicating or implying that a device or element has to have a specific orientation or be constructed and operated in a specific orientation, and therefore cannot be understood as a limitation to the present disclosure. In addition, terms "first", "second" and "third" are used for descriptive purposes only and cannot be understood as indicating or implying relative importance.

Please refer to FIGS. 1-10, the embodiments of the present disclosure provide an advertising apparatus compatible with multiple playback modes, including a main body 1. The main body 1 includes a display screen 2, a multi-function control module 3, a video box mounting component 5, a power supply board 4, a control box 6, and tempered glass 640. The tempered glass 640 covers the display screen 2 and an end face of the control box 6. The display screen 2 is electrically connected to the multi-function control module 3 and the power supply board 4. The video box mounting component 5 is configured to connect and mount a video box. The multi-function control module 3 is integrated with a video and data signal input/output module 310. The video and data signal input/output module 310 includes video and data signal input ports 314. The power supply board 4 includes a power supply interface. The multi-function control module 3 is configured to output system signals thereof to the display screen 2 through the video and data signal input/output module 310 for display. The video and data signal input/output module 310 is configured to output input video signal sources and data signal sources to the display screen 2 for display.

First Embodiment

An operating interface system, a memory, a processor, and a control circuit are disposed in the multi-function control module 3, when only native functions of the advertising machine are utilized, the operating interface system built in the multi-function control module 3 is displayed on the display screen 2. Video and data signals input to the video and data signal input/output module 310 and the extension adapter board 7 are displayed and played on the display screen 2 through the operating interface system of the multi-function control module 3. Alternatively, the operating interface system accesses video signals from the video box mounted in the video box mounting component 5 for display and playback on the display screen 2.

When functionality of the multi-function control module 3 fails to meet user requirements, the video box is connected to the video and data signal input ports 314 of the video and data signal input/output module 310, the video box is a user-owned device, and the video box is stably connected to the main body 1 through the video box mounting component 5. Through the operating interface system of the multi-function control module 3 or automatic recognition, the advertising apparatus switches a corresponding display video signal source to the video box, at this time, the video box serves as a video signal input terminal of the display screen 2.

Second Embodiment

The video and data signal input/output module 310 further includes the video and data signal input ports 314 and at least one video and data signal output port 315. Each of the video and data signal input ports 314 is selected from High-Definition Multimedia Interface (HDMI), Video Graphics Array (VGA), DisplayPort (DP), Digital Visual Interface (DVI), and composite video interface. The at least one video and data signal output port 315 is selected from Embedded DisplayPort (eDP), Low-Voltage Differential Signaling (LVDS), and V-by-One®.

In some embodiments, the video and data signal input ports 314 are the HDMI. In some other embodiments, the video and data signal input ports include the HDMI, the VGA, and the DVI. The video and data signal input ports include at least one of the HDMI, the VGA, and the DVI.

Third Embodiment

Figure 10:
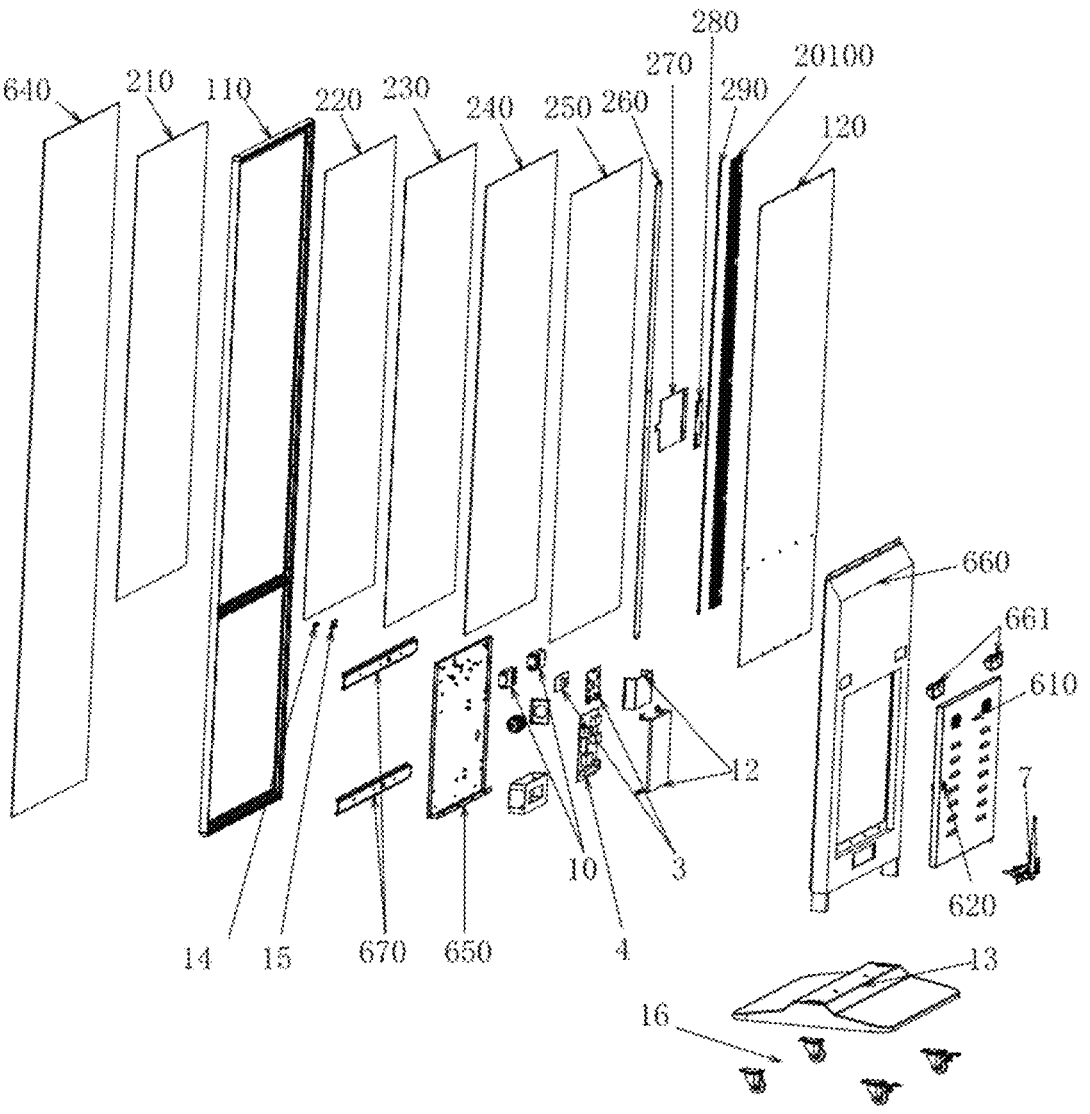
FIG. 10 is a further exploded structural schematic diagram of FIG. 9.

Please refer to FIG. 10, the display screen 2 includes liquid crystal glass 210, a brightness enhancement film 220, a diffusion film 230, a light guide plate 240, a reflective film 250, a pressing strip 260, a logic board bracket 270, a logic board 280, a light strip 290, and a heat dissipation plate 20100 for the light strip 290. The liquid crystal glass 210, the brightness enhancement film 220, the diffusion film 230, the light guide plate 240, the reflective film 250, the pressing strip 260, the logic board bracket 270, the logic board 280, the light strip 290, and the heat dissipation plate 20100 are sequentially disposed from a front side of the main body 1 to a rear side of the main body 1. The main body 1 includes an aluminum profile middle frame 110 and a rear cover plate 120. The tempered glass 640 and the rear cover plate 120 are respectively disposed at a front side of the aluminum profile middle frame 110 and a rear side of the aluminum profile middle frame 110, the tempered glass 640 and the rear cover plate 120 are connected to the aluminum profile middle frame 110 to enclose the display screen 2.

Specifically, the liquid crystal glass 210, the brightness enhancement film 220, the diffusion film 230, the light guide plate 240, the reflective film 250, the pressing strip 260, the logic board bracket 270, the logic board 280, and the heat dissipation plate 20100 are sequentially disposed from the front side of the main body 1 to the rear side of the main body 1. The light strip 290 is disposed on an inner side of the aluminum profile middle frame 110 and adjacent to at least one side of the light guide plate 240. Light emitted by the light strip 290 passes through the light guide plate 240 and is reflected forward by the reflective film 250 behind the light guide plate 240, and reflected light then sequentially passes through the diffusion film 230, the brightness enhancement film 220, the liquid crystal glass 210, and the tempered glass 640, thereby enabling display content on the display screen 2 to be visible from the front side of the main body.

The heat dissipation plate 20100 is disposed behind the reflective film 250 and the light strip 290, and the heat dissipation plate 20100 is fixed through a limiting component on the aluminum profile middle frame 110.

Fourth Embodiment

Figure 4:
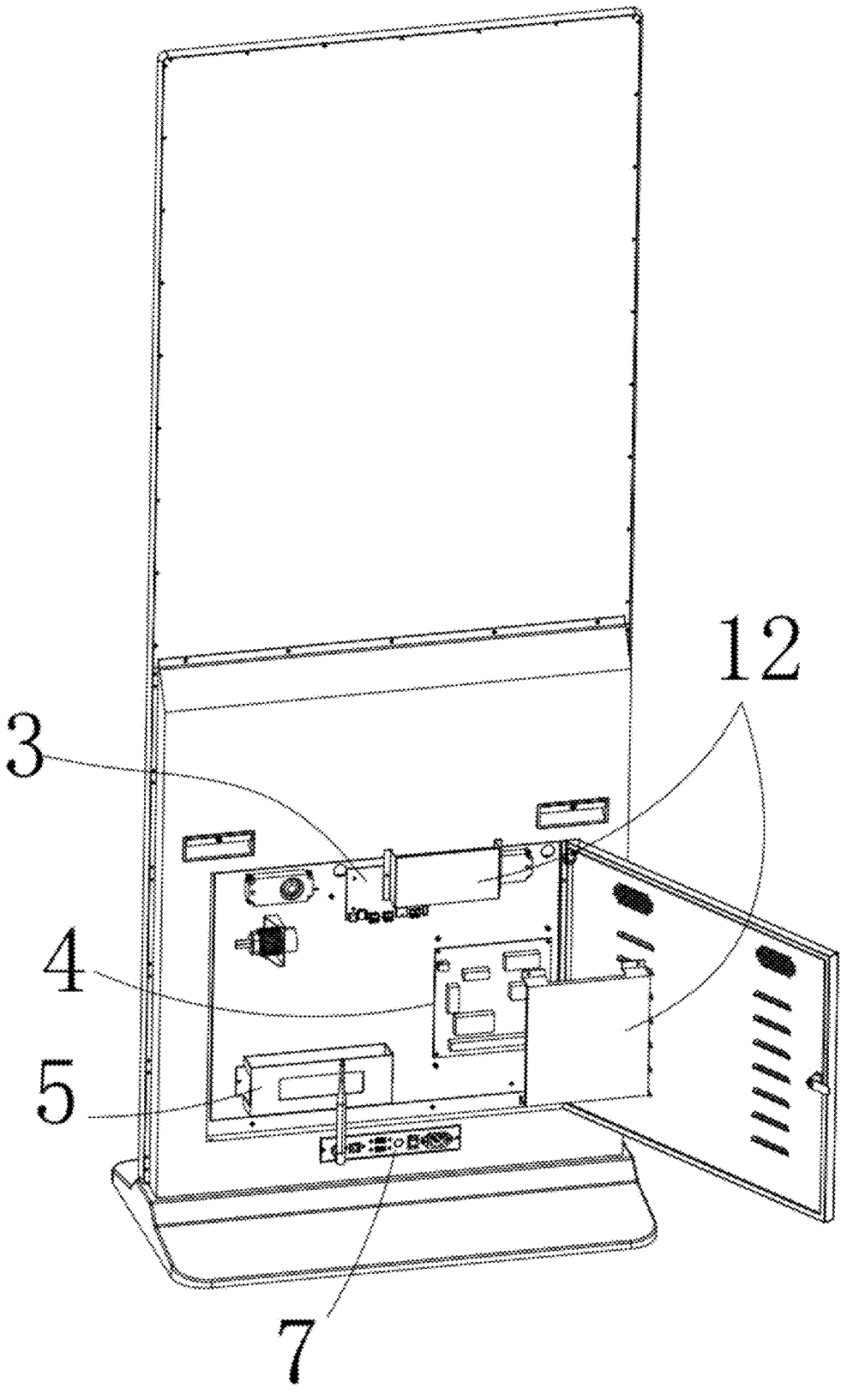
FIG. 4 is an exploded structural schematic diagram of the advertising apparatus according to the present disclosure.
Figure 6:
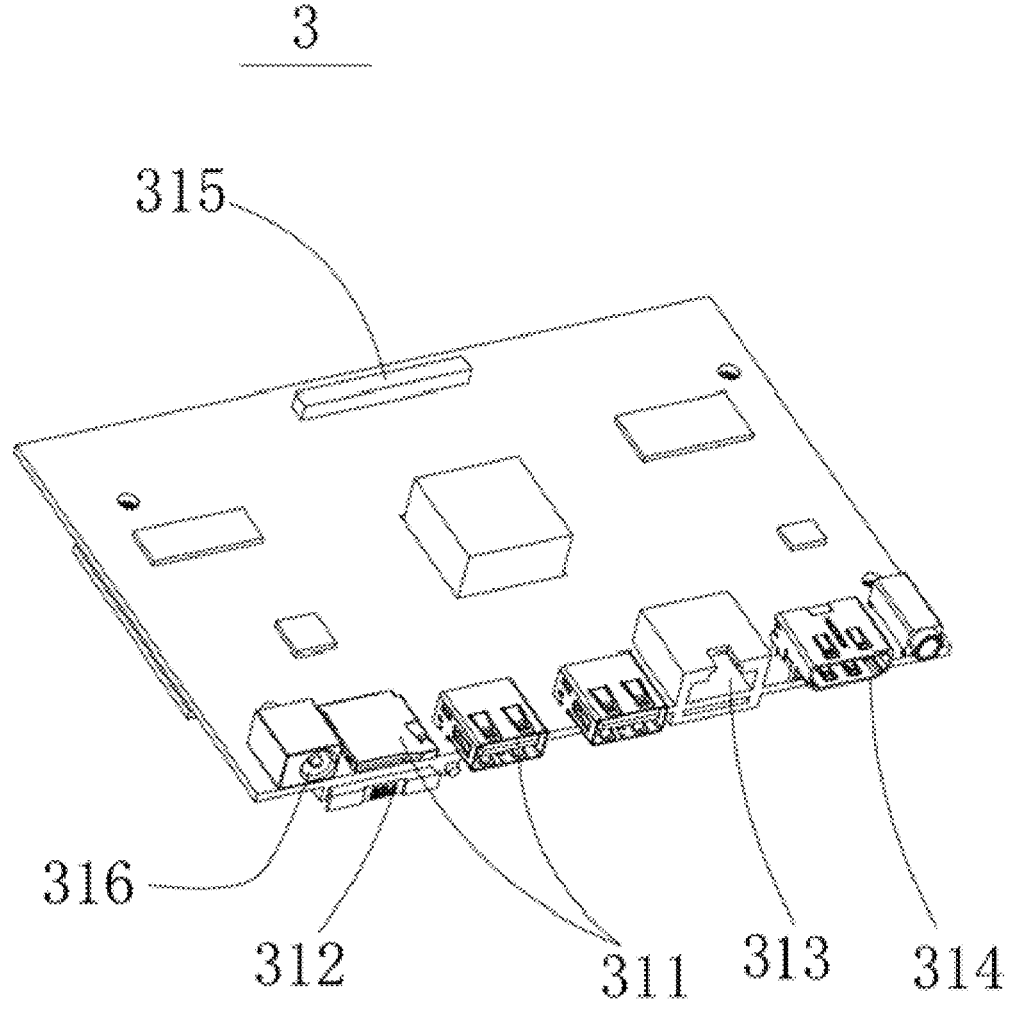
FIG. 6 is a structural schematic diagram of a video and data signal input/output module of the advertising apparatus according to the present disclosure.
Figure 7:
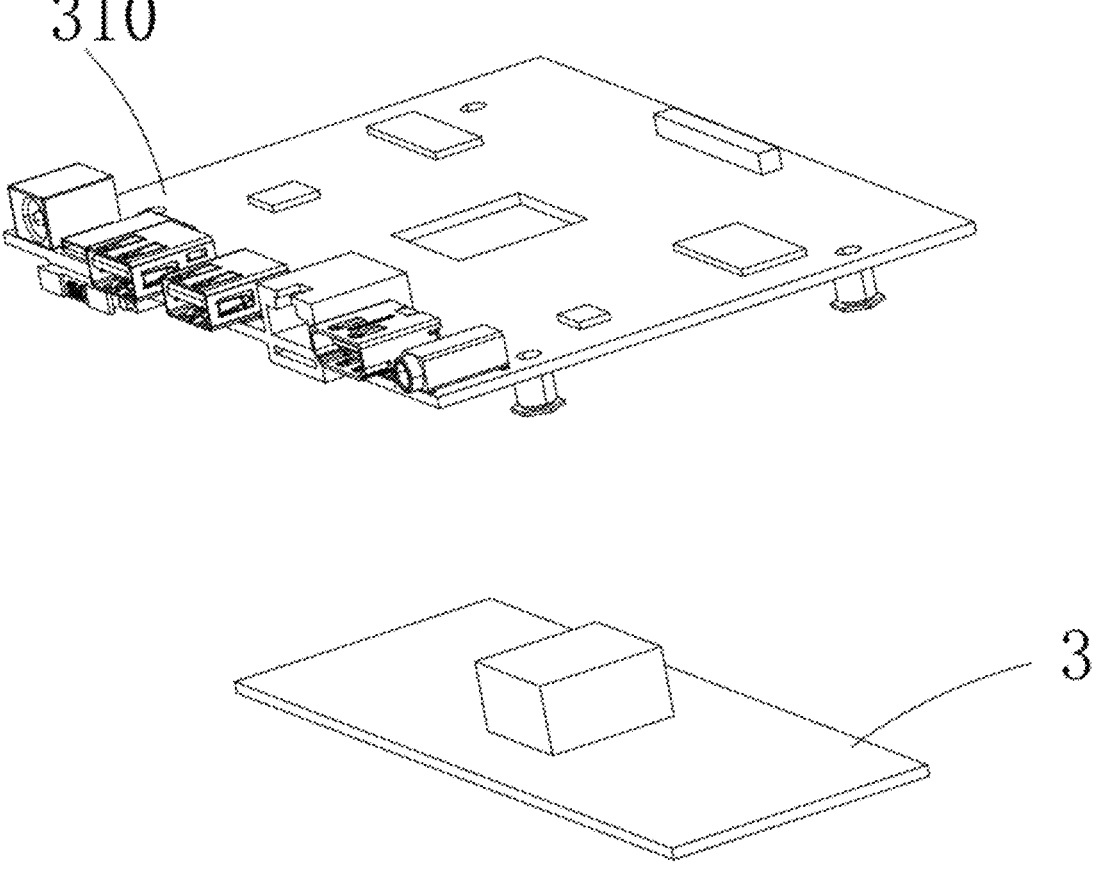
FIG. 7 is an exploded structural schematic diagram of the video and data signal input/output module of the advertising apparatus according to the present disclosure.

Please refer to FIGS. 4 and 6, the video and data signal input/output module 310 includes at least one first memory port 311. The at least one first memory port 311 includes at least one of Universal Serial Bus (USB) Type-C, Secure Digital (SD) card slot, USB Type-A. The multi-function control module 3 is configured to read multimedia files stored in a memory connected to the at least one first memory port 311 and display the multimedia files on the display screen 2 or copy the multimedia files to a built-in memory of the multi-function control module 3.

In some embodiments, the at least one first memory port 311 is a USB Type-A female port, with the memory being a USB flash drive or a card reader having a memory card inserted therein. Alternatively, the at least one first memory port 311 is a connection interface for a TransFlash (TF) memory card or an SD memory card.

The multi-function control module 3 incorporates a built-in system with an automatic playback function. When the USB flash drive is inserted, the multimedia files stored in the USB flash drive are automatically played. Additionally, the built-in system allows configuration to enable plug-and-play functionality for the USB flash drive or to copy the multimedia files to the built-in memory of a system motherboard for playback. Furthermore, the built-in system supports split-screen playback settings, enabling simultaneous display of images, videos, and other multimedia content in distinct areas of the display screen 2.

Please refer to FIGS. 4 and 6, the video and data signal input/output module 310 includes at least one of a subscriber identity module (SIM) card slot 312 and a first Ethernet port 313. The multi-function control module 3 is configured to display streaming media data on the display screen 2, and the streaming media data is received either through a SIM card inserted into the SIM card slot 312 or via the first Ethernet port 313.

The SIM card or the first Ethernet port 313 is configured to provide internet connectivity, transmit/receive network data, or relay control commands to the multi-function control module 3. In some embodiments, the Ethernet port 313 is an RJ-3105 interface.

Figure 8:
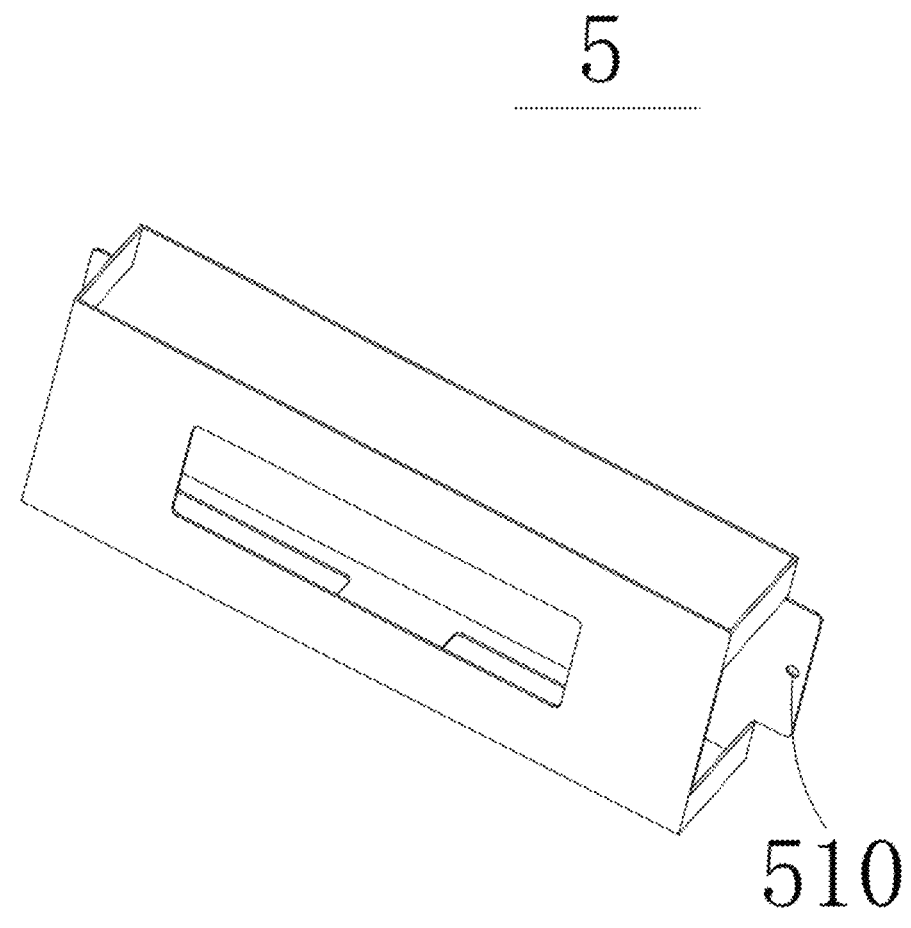
FIG. 8 is a structural schematic diagram of a video box mounting component of the advertising apparatus according to the present disclosure.

Please refer to FIG. 8, the video box mounting component 5 is configured to connect to and mount the video box, and the video box is selected from a digital television box, a television set-top box, a network media player box, a personal computer, a tablet computer, a mobile phone, a Digital Versatile Disc (DVD) player, and a Video Compact Disc (VCD) player.

The network media player box is a terminal for streaming network media, configured to display advertisements and multimedia content on the display screen 2.

The digital television box is also referred to as a digital television receiver (DTV) box. The digital television box is a device for receiving digital television signals to enable the display screen 2 to broadcast and display digital television programs.

The streaming media box is a compact computing terminal that connects to the video and data signal input/output module 310 through the HDMI or component video cables. The streaming media box allows web browsing, online video playback, application installations, and casting of photos/videos from user-owned smartphones or tablets to the display screen 2.

Based on above, the advertising apparatus of the present disclosure is compatible with multiple playback modes.

Please refer to FIGS. 4 and 8, the video box mounting component 5 is disposed in the control box 6, the video box mounting component 5 is a bracket structure having at least one open end, which is convenient for insertion and removal of the video box from the video box mounting component 5. The video box mounting component 5 includes a connecting portion 510, the connecting portion 510 is configured to be connected to the main body 1.

In some embodiments, the connecting portion 510 is a screw fastening hole on the bracket structure. The video box mounting component 5 is fixedly connected to the machine body 1 by inserting a screw into the connecting portion 510. The video box is mounted into the video box mounting component 5 through the at least one open end of the bracket structure.

Figure 2:
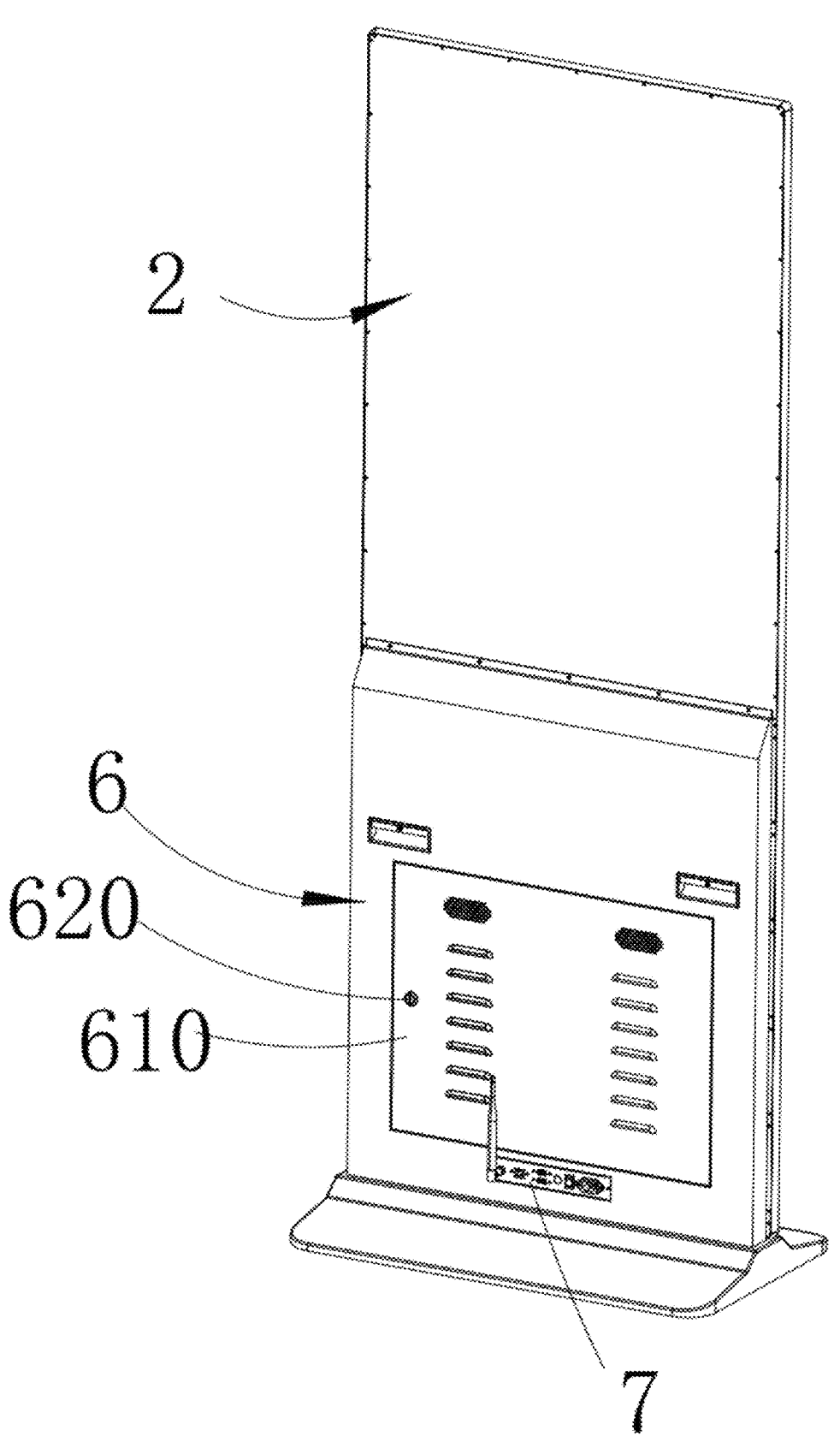
FIG. 2 is another structural schematic diagram of the advertising apparatus according to the present disclosure.
Figure 3:
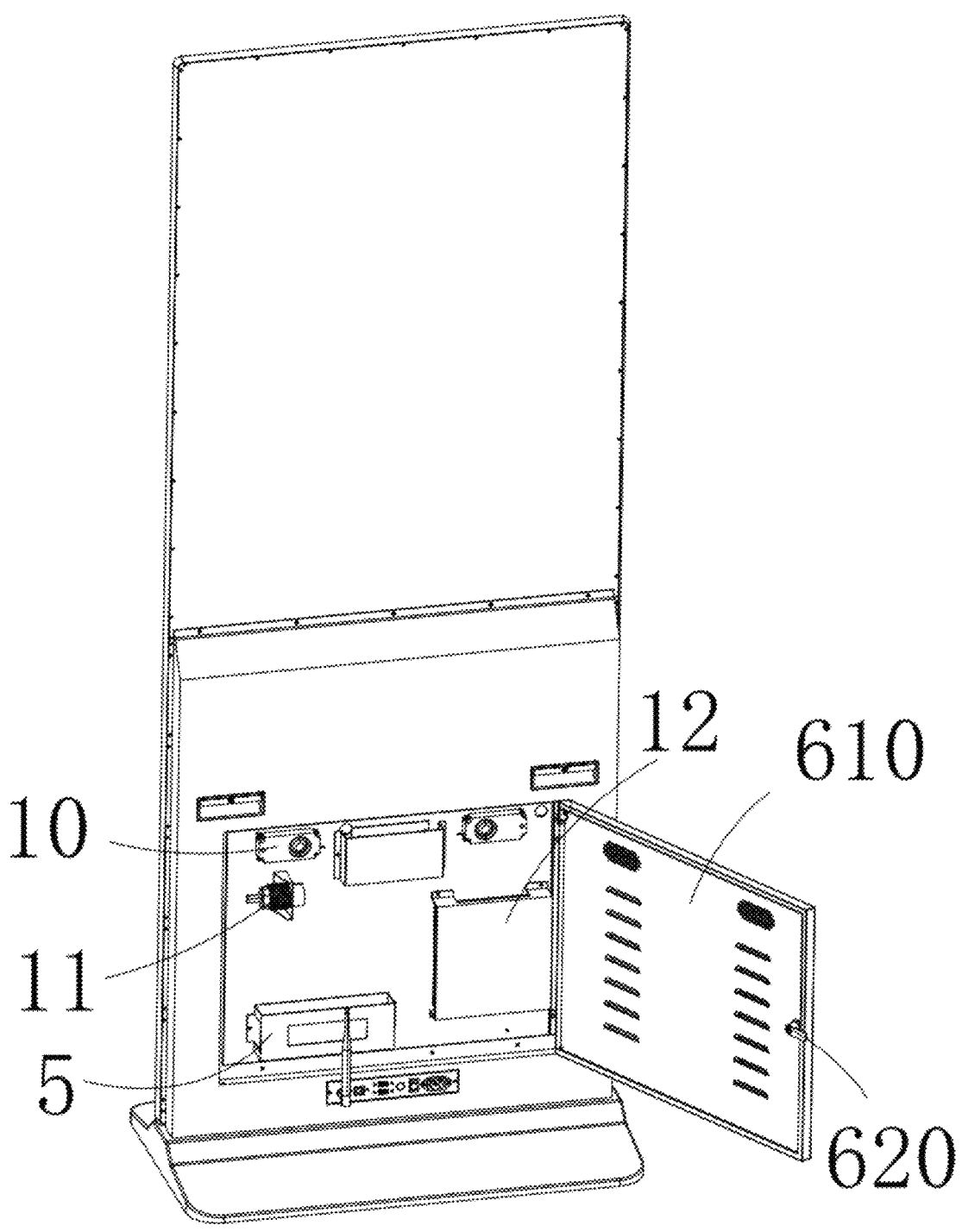
FIG. 3 is a structural schematic diagram of the advertising apparatus according to the present disclosure, in which a box cover is opened.

Please refer to FIGS. 2-4, the display screen 2 is vertically connected to the control box 6. The multi-function control module 3, the power supply board 4, and the video box mounting component 5 are all disposed in the control box 6.

In conventional advertising apparatuses, control components are typically disposed behind displays. Heat generated by the control components during operation, combined with heat from backlight modules of the displays, adversely affects lifespans and operational performance of the convention advertising apparatuses.

However, according to the present disclosure, the display screen 2 is vertically connected to the control box 6, which prevents concentrated heat buildup from both the display screen 2 and the control box 6 and further achieves a thinner overall profile.

Figure 9:
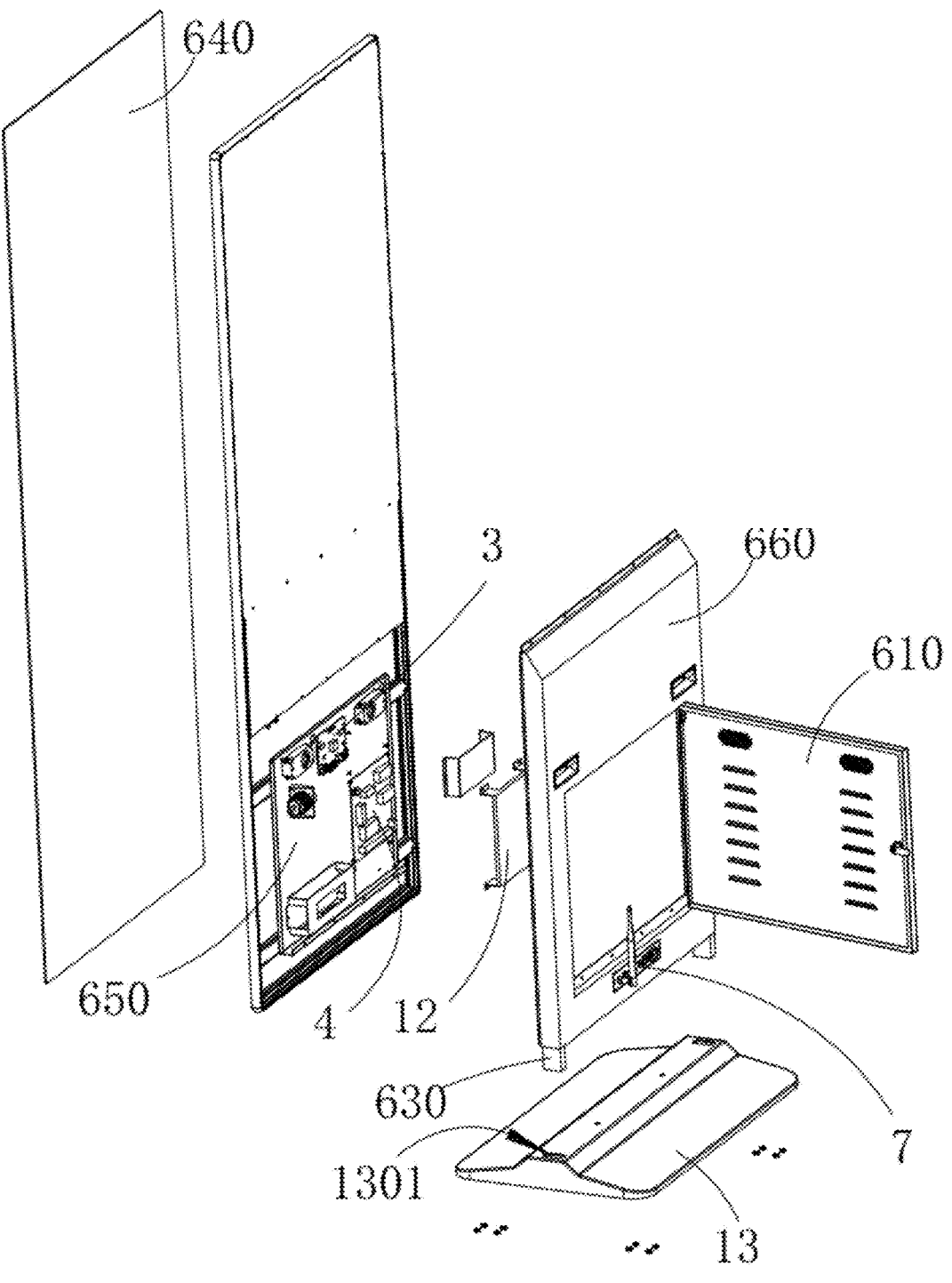
FIG. 9 is another exploded structural schematic diagram of the advertising apparatus according to the present disclosure.

Please refer to FIG. 9, the advertising apparatus further includes a bottom base 13. An inserting bracket 630 is disposed at a lower end of the control box 6, and the bottom base 13 includes inserting holes 1301 corresponding to the inserting bracket 630. Feet of the mounting bracket 630 of the control box 6 are inserted into the mounting holes 1301 and fixed to the bottom base 13 through screws and nuts. The bottom base 13 includes wheel mounting portions at a lower end thereof, and the wheel mounting portions are detachably connected to the wheel casters.

At least one remote control head 14 and at least one remote control head bracket 15 are further disposed in the control box 6.

Figure 5:
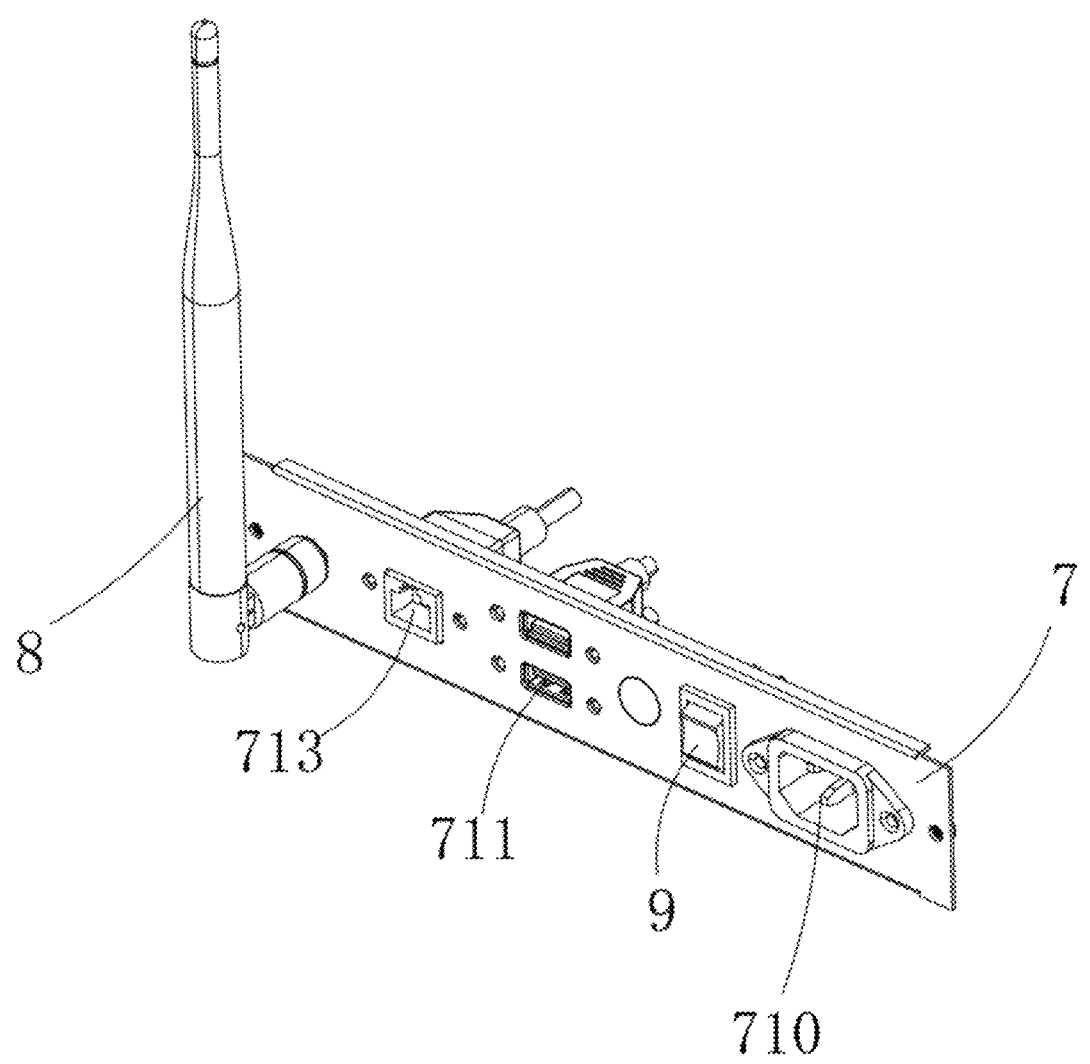
FIG. 5 is a structural schematic diagram of an extension adapter board of the advertising apparatus according to the present disclosure.

Please refer to FIGS. 4-5, the advertising apparatus further includes an extension adapter board 7, the extension adapter board 7 is disposed on the main body 1. The extension adapter board 7 includes a second Ethernet port 713, at least one second memory port 711, a second power supply port 710, a second antenna 8, and a master switch 9. The second Ethernet port 713, the at least one second memory port 711, the second power supply port 710, the second antenna 8, and the master switch 9 are exposed on an outer side of the main body 1. An output terminal of the second Ethernet port 713, an output terminal of the at least one second memory port 711, an output terminal of the second power supply port 710, and an output terminal of the second antenna 8 are disposed on one end of an inner cavity of the main body 1. The output terminal of the second Ethernet port 713, the output terminal of the at least one second memory port 711, the output terminal of the second power supply port 710, and the output terminal of the second antenna 8 are respectively electrically connected to an input terminal of the first Ethernet port 313, an input terminal of the at least one first memory port 311, an input terminal of a first power supply port 316, and an input terminal of a first second antenna 8 through corresponding cables (not shown in the drawings). The master switch 9 is electrically connected to the multi-function control module 3.

Through the extension adapter board 7, users perform control operations, such as inserting the USB flash drive into the at least one first memory port 311, without opening the control box 6. Additionally, Ethernet cables, memories, and the antenna 8 are indirectly connected to the video and data signal input/output module 310 through the extension adapter board 7.

The advertising apparatus further includes two protective covers 12. A box cover 610 is lockable and is rotatably connected to the control box 6. The two protective covers 12 respectively enclose the multi-function control module 3 and the power supply board 4. Each of the two protective covers 12 includes at least one opening at one side thereof for at least one cable to pass through.

Please refer to FIGS. 9-10, the tempered glass 640, the bottom mounting plate 650, the multi-function control module 3, the power supply board 4, the video box mounting component 5, a power supply socket 11, the two protective covers 12, a rear box cover 660, and the box cover 610 are sequentially disposed in the control box 6 from front to rear. Specifically, the multi-function control module 3 is disposed on the mounting bottom plate 650, and the box cover 610, being rotatable and lockable, is disposed on the rear box cover 660. The extension adapter board 7 is disposed on the rear box cover 660.

The mounting bottom plate 650 is connected to the aluminum profile middle frame 110 through the mounting bracket 670.

The tempered glass 640 not only covers a front face of the control box 6 but also covers the display screen 2.

The box cover 610 is secured to the control box 6 through a locking component 620, preventing unauthorized access or tampering by unpermitted individuals. Additionally, the extension adapter board 7 is capable of being disconnected from the at least one first memory port 311 of the video and data signal input/output module 310, the memory is then built in the control box 6 and directly connected to the video and data signal input/output module 310, preventing the memory from being removed or lost while attached to an exterior of the main body 1. The video box mounting component 5 is disposed in the control box 6 and protected by the box cover 610.

At least one handle 661 is disposed on the rear box cover 660, the rear box cover 660 is configured to facilitate transportation of the main body 1 and provide access to open the rear box cover 660.

Please refer to FIGS. 3-4, the advertising apparatus further includes at least one speaker 10 and the power supply socket 11. The at least one speaker 10 is electrically connected to the multi-function control module 3. The power supply socket 11 is disposed in the control box 6, and a socket orientation of the power supply socket 11 is non-parallel to a thickness direction of the control box 6. Such configuration ensures that when a power plug is inserted into the power supply socket 11, a cable extending from the power plug does not interfere with the box cover 610, a rear box cover 660, or a front box cover of the control box 6. The power supply socket 11 is electrically connected to the second power supply port 710.

A power input end of the power supply port 710 is connected to an external power supply, a power output end of the power supply port 710 is located on an inner side of the control box 6 and is connected to the power supply socket 11. The power supply socket 11 is configured to supply power to the video box.

In the specification and claims of the present disclosure, words "include/comprise" and "with/have" and variations thereof are used to specify presence of stated features, values, steps or components, but do not exclude presence or addition of one or more other features, values, steps, components, or a combination thereof.

Some features of the present disclosure are described in different embodiments for clarity of illustration, however, these features may also be described in combination with a single embodiment. On the contrary, some features of the present disclosure are only described in a single embodiment for sake of brevity, however, these features may also be separately described or in any suitable combination in different embodiments.

The foregoing are only preferred embodiments of the present disclosure and are not intended to limit the present disclosure, and any modifications, equivalent replacements and improvements made within a spirit and principle of the present disclosure shall be included in a protection scope of the present disclosure.

What is claimed is:

1. An advertising apparatus, comprising:
   a main body;
   wherein the main body comprises a display screen, a multi-function control module, a power supply board, a control box, and tempered glass;
   the tempered glass covers the display screen and an end face of the control box;
   the display screen is electrically connected to the multi-function control module and the power supply board;
   the multi-function control module is integrated with a video and data signal input/output module;
   the video and data signal input/output module comprises video and data signal input ports;
   the power supply board comprises a power supply interface;
   the multi-function control module is configured to output system signals thereof to the display screen through the video and data signal input/output module for display; and
   the video and data signal input/output module is configured to output input video signal sources and data signal sources to the display screen for display.

2. The advertising apparatus according to claim 1, wherein the video and data signal input/output module further comprises at least one video and data signal output port;
   each of the video and data signal input ports is selected from High-Definition Multimedia Interface (HDMI), Video Graphics Array (VGA), DisplayPort (DP), Digital Visual Interface (DVI), Universal Serial Bus (USB)

Type-C, composite video interface, Secure Digital (SD) card slot, and USB Type-A; and the at least one video and data signal output port is selected from Embedded DisplayPort (eDP), Low-Voltage Differential Signaling (LVDS), and V-by-One®.

3. The advertising apparatus according to claim 1, wherein the video and data signal input/output module comprises at least one first memory port; and the multi-function control module is configured to read multimedia files stored in a memory connected to the at least one first memory port and display the multimedia files on the display screen or copy the multimedia files to a built-in memory of the multi-function control module.

4. The advertising apparatus according to claim 1, wherein the video and data signal input/output module comprises at least one of a subscriber identity module (SIM) card slot and a first Ethernet port; and the multi-function control module is configured to display streaming media data on the display screen, and the streaming media data is received either through a SIM card inserted into the SIM card slot or via the first Ethernet port.

5. The advertising apparatus according to claim 1, wherein the advertising apparatus further comprises a video box mounting component, the video box mounting component is configured to connect to and mount a video box; and the video box is selected from a digital television box, a television set-top box, a network media player box, a personal computer, a tablet computer, a mobile phone, a Digital Versatile Disc (DVD) player, and a Video Compact Disc (VCD) player.

6. The advertising apparatus according to claim 5, wherein the video box mounting component is disposed in the control box, the video box mounting component is a bracket structure having at least one open end; and the video box mounting component comprises a connecting portion, the connecting portion is configured to be connected to the main body.

7. The advertising apparatus according to claim 5, wherein the display screen is vertically connected to the control box; and the multi-function control module, the power supply board, and the video box mounting component are all disposed in the control box.

8. The advertising apparatus according to claim 7, wherein the advertising apparatus further comprises an extension adapter board, the extension adapter board is disposed on the main body;

the extension adapter board comprises a second Ethernet port, at least one second memory port, a second power supply port, a second antenna, and a master switch;

the second Ethernet port, the at least one second memory port, the second power supply port, the second antenna, and the master switch are exposed on an outer side of the main body;

an output terminal of the second Ethernet port, an output terminal of the at least one second memory port, an output terminal of the second power supply port, and an output terminal of the second antenna are disposed on one end of an inner cavity of the main body; and the output terminal of the second Ethernet port, the output terminal of the at least one second memory port, the output terminal of the second power supply port, and the output terminal of the second antenna are respectively electrically connected to an input terminal of a first Ethernet port, an input terminal of at least one first memory port, an input terminal of a first power supply port, and an input terminal of a first antenna.

9. The advertising apparatus according to claim 7, wherein the advertising apparatus further comprises two protective covers;

a box cover is lockable and is rotatably connected to the control box;

the two protective covers respectively enclose the multi-function control module and the power supply board; and each of the two protective covers comprises at least one opening at one side thereof for at least one cable to pass through.

10. The advertising apparatus according to claim 8, wherein the advertising apparatus further comprises at least one speaker and a power supply socket;

the power supply socket is disposed in the control box;

the at least one speaker is electrically connected to the multi-function control module; and the power supply socket is electrically connected to the second power supply port of the extension adapter board.

11. An advertising apparatus, comprising:

a main body;

wherein the main body comprises a display screen, a multi-function control module, a video box mounting component, a power supply board, and a control box;

the video box mounting component is a bracket structure having at least one open end;

the video box mounting component comprises a connecting portion, the connecting portion is configured to be connected to the main body;

the display screen is vertically connected to the control box; and the multi-function control module, the power supply board, and the video box mounting component are all disposed in the control box;

the multi-function control module is integrated with a video and data signal input/output module, the multi-function control module is configured to output system signals thereof to the display screen through the video and data signal input/output module for display; and the video and data signal input/output module comprises video and data signal input ports, the video and data signal input/output module is configured to output input video signal sources and data signal sources to the display screen for display.

12. The advertising apparatus according to claim 11, wherein the advertising apparatus further comprises a power supply socket;

the power supply socket is disposed in the control box, and a socket orientation of the power supply socket is non-parallel to a thickness direction of the control box.

13. The advertising apparatus according to claim 11, wherein the advertising apparatus further comprises an extension adapter board, the extension adapter board is disposed on the main body;

the extension adapter board comprises a second Ethernet port, at least one second memory port, a second antenna, and a master switch;

the second Ethernet port, the at least one second memory port, the second antenna, and the master switch are exposed on an outer side of the main body;

US 12,633,238 B2

13 an output terminal of the second Ethernet port and an output terminal of the at least one second memory port are disposed on one end of an inner cavity of the main body;

the output terminal of the second Ethernet port and the output terminal of the at least one second memory port are respectively electrically connected to an input terminal of a first Ethernet port and an input terminal of at least one first memory port; and the master switch is electrically connected to the power supply board.

14. An advertising apparatus, comprising:

a main body;

wherein the main body comprises a display screen, a multi-function control module, a video box mounting component, a power supply board, a control box and tempered glass;

the tempered glass covers the display screen and an end face of the control box;

the video box mounting component is a bracket structure having at least one open end;

the video box mounting component comprises a connecting portion, the connecting portion is configured to be connected to the main body;

the display screen is vertically connected to the control box; and the multi-function control module, the power supply board, and the video box mounting component are all disposed in the control box.

15. The advertising apparatus according to claim 14, wherein the advertising apparatus further comprises a power supply socket;

the power supply socket is disposed in the control box, and a socket orientation of the power supply socket is non-parallel to a thickness direction of the control box.

16. The advertising apparatus according to claim 14, wherein the advertising apparatus further comprises an extension adapter board, the extension adapter board is disposed on the main body;

the extension adapter board comprises a second Ethernet port, at least one second memory port, a second antenna, and a master switch;

the second Ethernet port, the at least one second memory port, the second antenna, and the master switch are exposed on an outer side of the main body;

an output terminal of the second Ethernet port and an output terminal of the at least one second memory port are disposed on one end of an inner cavity of the main body;

the output terminal of the second Ethernet port and the output terminal of the at least one second memory port are respectively electrically connected to an input terminal of a first Ethernet port and an input terminal of at least one first memory port; and the master switch is electrically connected to the power supply board.

* * * * *